United States Patent Office 3,725,267
Patented Apr. 3, 1973

3,725,267
SOFTENING OF SEA WATER BY ADDITION OF BARIUM CARBONATE AND CO₂
P. Gideon Gelblum, Philadelphia, Pa., assignor to the United States of America as represented by the Secretary of the Interior
Filed Feb. 14, 1972, Ser. No. 225,940
Int. Cl. C02b 5/02
U.S. Cl. 210—48        16 Claims

ABSTRACT OF THE DISCLOSURE

To reduce or prevent scaling during distillation, barium carbonate and small, catalytic amounts of CO₂ are added to sea water to form barium bicarbonate in situ which rapidly reacts with sulfate and calcium, and forms precipitate consisting essentially of barium sulfate and calcium carbonate. The softened water can then be heated to precipitate out magnesium hydroxide.

---

This invention relates to softening sea water prior to evaporation or distillation.

To overcome formation of scale on heat transfer surfaces, efforts have heretofore been made to remove scale-forming calcium and magnesium salts prior to heating and distillation of sea water. However, there has been little success in developing rapid and effective methods for removing substantially all these salts. Classical boiler feed water techniques have been capable of removing only up to 80% of the calcium ions in sea water. Barium carbonate has been employed in an effort to soften sea water by reacting it with CaSO₄ to form such salt precipitates as BaSO₄, CaCO₃, and MgCO₃ as described in U.S. Pat. No. 3,525,675. However, barium carbonate is substantially insoluble in water, and has to be ground to very fine powder prior to its use. Even then this latter process requires excessively long reaction times.

In boiler feed water technology, it is known that water soluble barium bicarbonate, a much more expensive compound than BaCO₃, will rapidly react with calcium sulfate, which bicarbonate can be formed in situ by adding BaCO₃ to the water in the presence of CO₂. However, the large amounts of CO₂ required to stoichiometrically convert all the BaCO₃ to Ba(HCO₃)₂ prevents the precipitation of CaCO₃ in that the CaCO₃ remains in solution as Ca(HCO₃)₂. In this regard, the prior art (e.g., U.S. Pat. No. 466,709; British Pat. No. 20,591, A.D. 1908; and British Pat. No. 203,886) teaches that the resultant bicarbonate of calcium as well, as that of magnesium, can be subsequently removed by heating or liming the sulfate-depleted solution. This multi-step approach provides obvious drawbacks in the softening of sea water prior to a distillation operation. For example, liming the sea water introduces further salt problems. Additionally, so far as is known, prior to the present invention the barium bicarbonate reaction mechanism has not been explored with sea water; and sea water presents somewhat different problems than boiler feed water in that sea water contains much higher concentrations of sulfate, calcium and magnesium in addition to high concentrations of sodium and chloride ions, etc.

I have now discovered that the Ba(HCO₃)₂-CaSO₄ reaction mechanism is quite suitable for sea water, and that the barium bicarbonate can be formed in situ from barium carbonate by the addition of CO₂ in amounts far less than that required to stoichiometrically convert all the insoluble barium carbonate to the soluble bicarbonate. Yet the reaction rate is as rapid as if stoichiometric quantities of CO₂ had been employed.

Since only small amounts of CO₂ are injected into sea water in the practice of my invention, calcium carbonate can form which simultaneously precipitates with the barium sulfate. It is believed that the reactions in the sea water proceed as follows:

(1) $CO_2(gas) + H_2O \rightarrow H_2CO_3$
(2) $BaCO_3(solid) + H_2CO_3 \rightarrow Ba(HCO_3)_2$
(3) $Ba(HCO_3)_2 \rightarrow Ba^{+2} + 2HCO_3^-$
(4) $Ba^{+2} + SO_4^= \rightarrow BaSO_4(solid)$
(5) $Ca^{+2} + 2HCO_3^- \rightarrow CaCO_3(solid) + CO_2(gas) + H_2O$ Equations 1 through 4 may be illustrated in one equation as follows:

(6) $BaCO_3(solid) + CO_2(gas) + H_2O + SO_4^= \rightarrow 2HCO_3^- + BaSO_4(solid)$ As seen from the above equations, the formation of CaCO₃ in Equation 5 produces CO₂ which is then available as a reactant for Equation 1 or 6. Thus, there is a continuous internal rapid recycling of CO₂ whereby only small amounts of CO₂ are initially required. In effect, the CO₂ initially added to the sea water acts as a catalyst. More than 95% of both the calcium and the sulfate can be rapidly removed from the sea water in this manner.

An additional factor in the present invention is that magnesium remains in solution during decalcification and desulfating. Accordingly, it may be separately recovered as Mg(OH)₂ by simply subsequently heating the softened water to above 170° F.

I have further discovered that injecting small amounts of a mineral acid or its oxide, in addition to the CO₂, markedly accelerates the reaction mechanism which precipitates BaSO₄ and CaCO₃.

It is therefore an object of the present invention to rapidly desulfate and decalcify sea water.

Another object is to spontaneously react water-immiscible BaCO₃ (solid) by means of a catalytic bicarbonate mechanism that uses less than stoichiometric amounts of CO₂ regardless of the particle size of BaCO₃.

Another object is to separately recover magnesium from sea water.

A further object is to substantially completely decalcify the sea water.

A still further object is to convert any BaCO₃ in a sea water environment to Ba(HCO₃)₂ while externally supplying less than the stoichiometric amounts of CO₂ necessary for such a conversion.

Other objects and advantages will be obvious from the following more detailed description of the invention taken in conjunction with the drawings in which.

Figure 1:
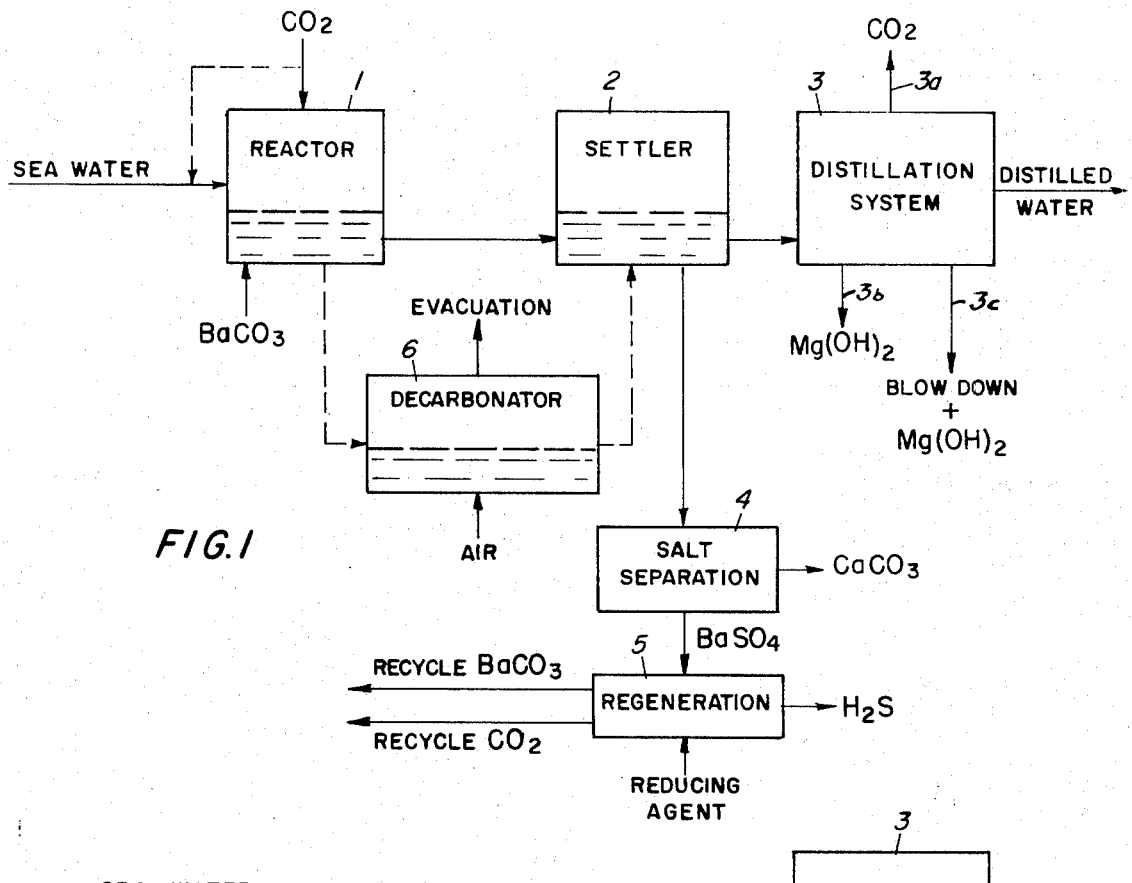
FIG. 1 is a schematic drawing of the process of the present invention.

Referring to FIG. 1, in the practice of the present invention raw sea water is fed into a closed vessel 1. CO₂ is added to the water prior to or after the water's introduction into the vessel, and is added in sufficient quantity to lower the pH to a value within the range of about 6 to 7, preferably about 6.0 to 6.5. As a further limitation, when the barium carbonate-to-sulfate ion mole ratio is to be at least 1 to 3, the CO₂ is employed in an amount, on a CO₂-barium mole ratio basis, of about 1:2 to 1:10, preferably about 1:3 to 1:5. Requisite amounts of CO₂ can be maintained in solution by establishing and maintaining a predetermined CO₂ partial pressure above the sea water in closed vessel 1.

After injection of CO₂ the BaCO₃ is added to vessel 1 in particulate or slurry form. It is not necessary to finely grind the BaCO₃ since coarse particles rapidly dissolve in the presence of CO₂. Dissolution is more rapid at lower pH and a higher CO₂-to-barium ratio. Intimate contact between the reactants can be obtained by maintaining turbulence (not shown) in the reaction system.

As to the amount of $BaCO_3$ to be employed, it is dependent upon the desired degree of calcium and sulfate removal; and the following must be taken into consideration:

(a) For every mole of calcium in sea water there are about three moles of sulfate; and (b) The reaction mechanism of the present invention as described in the previously enumerated formulas proceeds essentially stoichiometrically with regard to substantially all the calcium and sulfate.

Accordingly, the addition of just enough barium carbonate to remove all the calcium results in the removal of about ⅓ of the sulfate. Alternatively, the addition of just enough barium carbonate to remove all the sulfate results in the removal of essentially all the calcium and furthermore supplies "excess" carbonate ions.

In fact, any time that barium carbonate is added in a quantity more than that required to react with all the calcium, there will be "excess" carbonate ions. These "excess" ions are then "free" to combine, in effect, with magnesium when the decalcified water is subsequently heated to above 170° F. in, for example, the first evaporation stage of the distillation system at which conditions $MgCO_3$ is thermally decomposed to produce the water immiscible $Mg(OH)_2$ as follows:

$$MgCO_3 + H_2O \rightarrow Mg(OH)_2\downarrow + CO_2$$

Accordingly, if desired, substantial quantities of $Mg(OH)_2$ can be separately produced by the process of the present invention by simply adding barium carbonate in amounts greater than that required to effect complete decalcification, e.g., by adding the barium carbonate in quantities sufficient to effect complete desulfating.

Generally, the water temperature during the

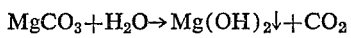

reaction is about 60° F., to 170° F., preferably about 100° F. to 140° F. The reaction completes itself within about 5–10 minutes, depending only on the degree of desulfating, the Ba-to-$CO_2$ ratio and pH of the system. Thereafter the $BaSO_4$-$CaCO_3$ joint precipitate is allowed to settle out of the softened sea water in a separate clarifier vessel 2 or any comparable unit operation. Settling usually takes less than 1 hour. Temperatures higher than 100° F. effect more rapid settling, and at a temperature of about 140° F., the precipitate settles out usually within ten minutes. Centrifugal force may be employed to accelerate precipitate separation, as can drag enhancing equipment, etc.

Softened sea water overflow from the settler is sent to the distillation system 3 such as a multi-stage flash system, while the underflow, usually consisting of 30 to 50 weight percent solids, is sent to a salt recovery unit 4 and barium carbonate regeneration system 5. If the barium carbonate has been added in amounts greater than that required to effect complete decalcification, then, as disclosed above, substantial amounts of $MgCO_3$ will be present in the sea water introduced into the distillation system. As such, the $MgCO_3$ will react with water in the system at temperatures above 170° F. and will form (a) $CO_2$ gas which leaves the system at 3a and (b) $Mg(OH)_2$ precipitate which is removed at 3b and 3c.

At some point between the reaction vessel and distillation system, the $CO_2$ in the gas above the sea water can be evacuated in, for example, a decarbonation vessel 6, wherein the water is stripped with air. Such decarbonation substantially eliminates any dissolved $CO_2$. As a result, the pH of the system rises and the residual calcium carbonate that was held in the water as bicarbonate is precipitated out. Accordingly, it is desirable to effect such decarbonation prior to the precipitate settling step. No heat is required during decarbonation, i.e., the water temperature is not increased beyond the reaction temperature. Other prior art decarbonation techniques such as steam stripping are also suitable.

Alternatively, the reaction effluent is fed directly into the separator without prior degasification. In this case the decarbonation is completed within the desalination equipment, in the first or any of the flash stages.

The joint precipitate of $BaSO_4$ and $CaCO_3$ in the underflow stream from the settling tank 2 is treated in salt separation zone 4 to separate these two salts from one another. This can be accomplished by, for example, conventional flotation techniques or by redissolving the calcium carbonate through the addition of $CO_2$ that reprecipitates the immiscible $BaSO_4$.

Once the $BaSO_4$ is separated out, it is eventually calcined and recarbonated in zone 5 in the prior art manner described, for example, in U.S. Pat. No. 3,525,675 so as to produce $CO_2$, $BaCO_3$ and $H_2S$. The $CO_2$ and $BaCO_3$ are then recycled for use in the softening reaction vessel 1, while the $H_2S$ can be treated in the prior art manner to produce, for example, sulfur or sulfuric acid.

Figure 2:
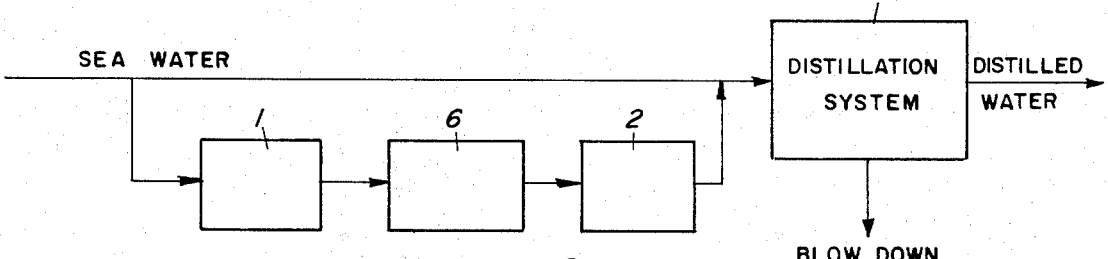
FIG. 2 is a modification.

Referring now to FIG. 2, in practice it is often not desirable to remove more than 60–70% of the calcium from sea water. That is, the operating conditions of the distillation system will be such that there are no scale problems provided that the sea water is 60–70% decalcified (equimolar amounts of sulfate also having been removed). Accordingly, since the present invention readily removes more than 95% of the calcium from a body of water, it will only be necessary to treat a fraction of the sea water stream being sent to the distillation system (see FIG. 2) in order to decalcify the total amount of sea water to the extent of 60–70%. This, of course, reduces the size of the plant and its operating costs.

Figure 3:
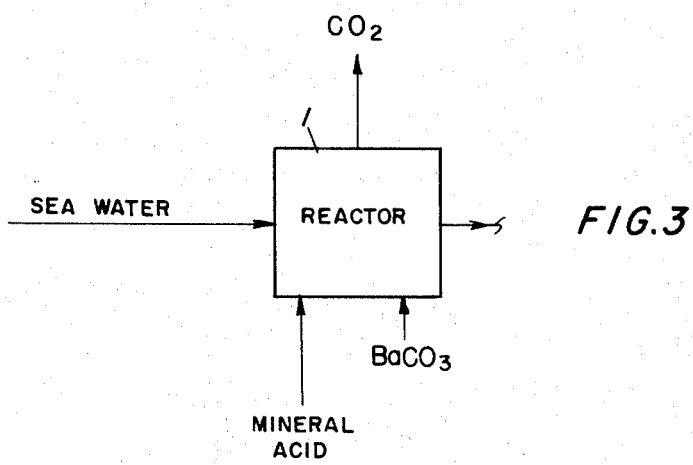
FIG. 3 is fragmentary view of a further modification.

Referring now to FIG. 3, therein is shown a system for further accelerating the reaction mechanism which produces $BaSO_4$ and $CaCO_3$, and which is particularly suitable for essentially completely desulfating the water. In this embodiment, in addition to $CO_2$, a mineral acid such as HCl, $H_2SO_4$ or $HNO_3$ or their respective oxides ($SO_2$, $NO_2$, etc.) is injected into the sea water prior to the $BaCO_3$. The amount of acid or $H^+$ ion formed in situ by addition of acid oxide, on a mole ratio basis of acid to barium carbonate, expressed as $H^+$:Ba, is about 1:100 to 1:5. Prior to addition of $BaCO_3$, the $CO_2$ content of the sea water is established at about 1:5–1:10, preferably 1:7–1:8, on a $CO_2$:Ba mole ratio basis. Although the combination of $CO_2$ and acid tends to prevent some of the calcium from precipitating out when the $BaCO_3$ is added, the combination will precipitate as much as 50% of the calcium and more than 95% of the $SO_4$ in as little as about 1–2 minutes. A discussion of the effects of acid per se on the in situ formation of $Ba(HCO_3)_2$ in sea water is presented in copending application S.N. 225,941.

The following example shows the catalytic effect of $CO_2$ in the process of the present invention.

EXAMPLE 1

Two samples of simulated sea water having the following composition were prepared: 2560 p.p.m. sulfate; 18,856 p.p.m. chloride; 1360 p.p.m. magnesium; 402 p.p.m. calicum; 10,380 p.p.m. sodium; pH 7.95. To each sample was added varying amounts of $CO_2$ after which barium carbonate was added in sufficient quantity to react, as $Ba(HCO_3)_2$ with all the sulfate in the sea water. One sample contained sufficient $CO_2$ to stoichiometrically react with all the $BaCO_3$ so as to form $Ba(HCO_3)_2$. The other sample contained $CO_2$ in about ½ of this stoichiometric amount. Both reactions were carried in less than ten minutes. In both cases more than 95% of the sulfate had been removed.

The following example illustrates how magnesium remains in the softened sea water so that it can later be separately recovered from the water.

EXAMPLE 2

To a sample of simulated sea water having the same composition as Example 1 was added just sufficient $BaCO_3$ to stoichiometrically react as $Ba(HCO_3)_2$ with all the sulfate. $CO_2$ had previously been injected into the water in an amount; on a $CO_2$:Ba mole ratio, of about 1:4. At the completion of the reaction, and prior to settling, the water was decarbonated by evacuation and air stripping in the absence of additional heat. After precipitate separation, it was determined that more than 95% of the calcium and more than 95% of the sulfate had been removed. Essentially no magnesium was present in the precipitate. The softened water was subsequently heated to 260° F. to form a white precipitate which was analyzed to be magnesium hydroxide.

What is claimed is:

1. A process for softening sea water so as to prevent scaling during subsequent heating and evaporation of said water consisting essentially of:
   (a) adding barium carbonate to said sea water;
   (b) prior to adding said barium carbonate, adding $CO_2$ to said water in an amount sufficient to lower the pH of raw sea water to a pH of about 6–7 and sufficient to form a joint precipitate consisting essentially of $BaSO_4$ and $CaCO_3$; and
   (c) after said barium carbonate is added, removing from said water a joint precipitate consisting essentially of $BaSO_4$ and $CaCO_3$.

2. The process of claim 1 wherein the mole ratio between said $CO_2$ and said barium carbonate is about 1:2 to 1:10.

3. The process of claim 2 wherein said $CO_2$:barium mole ratio is about 1:3 to 1:5.

4. The process of claim 2 wherein, after addition of said barium carbonate and prior to removal of said joint precipitate, $CO_2$ is removed from said water by reducing the pressure above said water and simultaneously stripping said water with air, without increasing the temperature of said water during said pressure reduction and stripping steps.

5. The process of claim 2 wherein the temperature of said water throughout all of said steps is about 60° F. to about 170° F.

6. The process of claim 2 wherein said pH is about 6.0–6.5.

7. The process of claim 2 wherein said $BaCO_3$ is added in an amount greater than that required to stoichiometrically react, as $Ba(HCO_3)_2$ with all the calcium in said sea water; and wherein magnesium is recovered from said sea water as magnesium hydroxide by heating said water to above 170° F. after said $BaSO_4$ and $CaCO_3$ have been removed therefrom.

8. The process of claim 3 wherein, after addition of said barium carbonate and prior to removal of said joint precipitate, $CO_2$ is removed from said water by reducing the pressure above said water and simultaneously stripping said water with air, without increasing the temperature of said water during pressure reduction and stripping steps.

9. The process of claim 8 wherein said pH is about 6.0–6.5.

10. The process of claim 9 wherein said $BaCO_3$ is added in an amount greater than that required to stoichiometrically react, as $Ba(HCO_3)_2$ with all the calcium in said sea water; and wherein magnesium is recovered from said sea water as magnesium hydroxide by heating said water to above 170° F. after said $BaSO_4$ and $CaCO_3$ have been removed therefrom.

11. The process of claim 10 wherein said temperature is about 60° F. to 170 °F.

12. The process of claim 11 wherein said temperature is about 100° F. to 140° F.

13. The process of claim 12 wherein said $CO_2$:barium mole ratio is about 1:3 to 1:5.

14. A process for softening sea water so as to prevent scaling during subsequent heating and evaporation of said water consisting essentially of:
   (a) adding barium carbonate to said water in an amount of about one mole per mole of sulfate in said water;
   (b) prior to adding said barium carbonate, adding a mineral acid or its oxide to said water in an amount, on a mole ratio basis of acid to barium carbonate expressed as $H^+$:Ba, of about 1:100 to 1:5;
   (c) prior to adding said barium carbonate; adding $CO_2$ to said water in an amount such that the $CO_2$ content of said water is established at about 1:5–1:10 on a $CO_2$:Ba mole ratio basis and sufficient to form a joint precipitate consisting essentially of $BaSO_4$ and $CaCO_3$; and
   (d) after said barium carbonate is added, removing from said water a joint precipitate consisting essentially of $BaSO_4$ and $CaCO_3$.

15. The process of claim 14 wherein said $CO_2$:Ba mole ratio is about 1:7–1:8.

16. The process of claim 14 wherein said $H^+$ ion in step (b) is formed in situ by adding $SO_2$ or $NO_2$ to said water.

References Cited

UNITED STATES PATENTS

| | | | |
|---|---|---|---|
| 413,432 | 10/1889 | Bradburn et al. | 210—53 |
| 466,709 | 1/1892 | Bradburn et al. | 210—53 |
| 3,525,675 | 8/1970 | Gaudin | 203—7 |

FOREIGN PATENTS

| | | | |
|---|---|---|---|
| 203,886 | 9/1923 | Great Britain | 210—53 |

OTHER REFERENCES

Chem. Abstracts, vol. 28, 2439–4.

MICHAEL ROGERS, Primary Examiner

U.S. Cl. X.R.

159—DIG. 13; 203—7; 210—45, 53, 57; 423—554